United States Patent [19]

Horowitz et al.

[11] 4,225,469
[45] Sep. 30, 1980

[54] METHOD OF MAKING LEAD AND BISMUTH PYROCHLORE COMPOUNDS USING AN ALKALINE MEDIUM AND AT LEAST ONE SOLID REACTANT SOURCE

[75] Inventors: Harold S. Horowitz, Clark; John M. Longo, New Providence; Joseph T. Lewandowski, Middlesex, all of N.J.

[73] Assignee: Exxon Research & Engineering Co., Florham Park, N.J.

[21] Appl. No.: 956,745

[22] Filed: Nov. 1, 1978

Related U.S. Application Data

[63] Continuation-in-part of Ser. No. 856,648, Dec. 2, 1977.

[51] Int. Cl.² .............................................. H01B 1/06
[52] U.S. Cl. .................... 252/518; 423/593; 429/40
[58] Field of Search ..................... 252/518; 423/593; 429/40

[56] References Cited

U.S. PATENT DOCUMENTS

| | | | |
|---|---|---|---|
| 3,305,402 | 2/1967 | Jones et al. | 429/44 |
| 3,405,010 | 10/1970 | Kordesch et al. | 429/44 |
| 3,536,533 | 10/1970 | Kitamura | 429/40 |
| 3,682,840 | 8/1972 | Van Loan | 252/518 |
| 3,769,382 | 10/1973 | Kuo et al. | 264/61 |
| 3,896,055 | 7/1975 | Bouchard et al. | 252/518 X |
| 3,951,672 | 4/1976 | Langley et al. | 252/514 X |
| 4,124,539 | 11/1978 | Horowitz et al. | 252/518 |

OTHER PUBLICATIONS

Trehoux, Jacques et al., "C. R. Acad. Sc. Paris," vol. 281 (Sep. 15, 1975) Series C-379.
Morgenstern–Badarau, Irene et al., "C. R. Acad. Sc. Paris," 271 (Nov. 23, 1970) pp. 1313–1316.
Morgenstern–Badarau, I. et al., "Ann. Chim." vol. 6: pp. 109–113 (1971).
Trehoux, Jacques et al., "Journal of Solid State Chemistry", 21: pp. 203–209 (1977).
Bouchard, R. J. et al., "Mat. Res. Bull.", vol. 6, pp. 669–680, 1971.
Sleight, A. W. "Mat. Res. Bull.", vol. 6, pp. 775+ (1971).
Longo, J. M. et al., "Mat. Res. Bull.", vol. 4, pp. 191–202, 1969.
O'Grady, W. et al., "Ruthenium Oxide Catalysts for the Oxygen Electrode", Contract No. N00014-67-A-04-04-0006 (AD-779-899) Office of Naval Research, May 1, 1974.

Primary Examiner—Benjamin R. Padgett
Assistant Examiner—J. L. Barr
Attorney, Agent, or Firm—K. P. Glynn

[57] ABSTRACT

A method of preparing electrically conductive pyrochlore compounds having the formula:

$$A_2[B_{2-x}A_x]O_{7-y}$$

is disclosed wherein A is selected from lead, bismuth and mixtures thereof, B is selected from ruthenium, iridium and mixtures thereof, $0 \leq x \leq 1.0$ and $0 \leq y \leq 1$. The method involves reacting A and B cations using at least one solid reactant source of these cations in a liquid alkaline medium having a pH of at least about 13.5 in the presence of an oxygen source at a temperature below about 200° C. for a sufficient time for reaction to occur.

42 Claims, No Drawings

METHOD OF MAKING LEAD AND BISMUTH PYROCHLORE COMPOUNDS USING AN ALKALINE MEDIUM AND AT LEAST ONE SOLID REACTANT SOURCE

CROSS REFERENCE TO RELATED APPLICATIONS

This application is a continuation-in-part of U.S. Ser. No. 856,648, filed Dec. 2, 1977, entitled "Method of Making Lead-Rich And Bismuth-Rich Pyrochlore Compounds Using An Alkali Medium."

BACKGROUND OF THE INVENTION AND PRIOR ART STATEMENT

The present invention is directed to a method of preparation of pyrochlore structure compounds. More particularly, the present invention is directed to a method of preparing stoichiometric lead and bismuth ruthenate and irridate and lead-rich and bismuth-rich ruthenate and iridate pyrochlores. These pyrochlores have many uses including use as oxygen electrodes in electrochemical devices.

A number of various types of electrochemical devices have been developed over the past few years for the production of electrical energy by electrochemical reaction and obversely for the consumption of electrical energy to effectuate electrochemical reactions. Many of these devices rely upon a reaction involving oxygen (or air) as part of the mechanism to accomplish the desired result. For example, such devices may contain oxygen electrodes which are oxygen reducing cathodes in which oxygen is catalytically electroreduced. Alternatively, such devices may contain oxygen electrodes which catalyze the evolution of oxygen from water. In general, these electrodes are known in the art as oxygen electrodes. Thus, metal-oxygen batteries, fuel cells, electrolyzers, metal electrowinning devices, etc., are among the well-known electrochemical devices which may contain oxygen electrodes. Typically, such devices contain electrocatalyst materials at one or more of their electrodes and precious metals, such as platinum (on carbon support) and silver (on carbon and other supports), are frequently employed as electrocatalysts.

In addition, various electrocatalytic alloys, compounds and compound mixtures have been developed for these electrochemical devices to achieve more desirable systems. For example, U.S. Pat. No. 3,536,533 (Kitamura) describes the use of an alloy of gold, silver, palladium and at least one of platinum, rhodium and ruthenium as a fuel cell electrode electrocatalyst, and U.S. Pat. No. 3,305,402 (Jones et al.) describes the use of a combination of platinum and ruthenium oxides as an electrocatalyst. However, both references describe these catalysts as fuel cell anode (or fuel oxidation) catalysts. O'Grady et al., Technical Report No. 37, "Ruthenium Oxide Catalysts For The Oxygen Electrode," Contract No. N0014-67-A-0404-0006 (AD-779-899), Office of Naval Research, May, 1974 (National Technical Information Service) describes the use of ruthenium oxide as an electrochemical catalyst for both the generation of oxygen and the reduction of oxygen. U.S. Pat. No. 3,405,010 (Kordesch et al.) teaches that spinel type electrode catalysts have been found to produce better activation of the electrode and improved electrolyte repellency of the electrode by the inclusion of ruthenium.

The foregoing prior art describes various types of electrodes including those which utilize iridium and/or ruthenium-containing catalysts. However, none of these references teaches or renders obvious the particular method of preparation of pyrochlore compounds as claimed herein.

Heretofore, many pyrochlore compounds such as the pyrochlore compounds $Pb_2Ru_2O_{7-y}$ (lattice parameter of 10.253 Å), $Pb_2Ir_2O_{7-y}$ (lattice parameter of 10.271 Å), $Bi_2Ir_2O_{7-y}$, $Bi_2Rh_2O_{7-y}$, $Pb_2Rh_2O_{7-y}$, $Pb_2Pt_2O_{7-y}$ and $Cd_2Re_2O_{7-y}$, commonly referred to as lead ruthenate, lead iridate, bismuth iridate, bismuth rhodate, lead rhodate, lead platinate and cadmium rhenate, respectively, and similar compounds, have been known. For example, Longo, Raccah and Goodenough, Mat. Res. Bull., Vol. 4, pp. 191–202 (1969), have described the compounds $Pb_2Ru_2O_{7-y}$ and $Pb_2Ir_2O_{7-y}$ and their preparation at elevated temperatures which are in excess of 700° C. Sleight, Mat. Res. Bull., Vol. 6, p. 775 (1971) has also described the compounds $Pb_2Ru_2O_{7-y}$ and $Pb_2Ir_2O_{7-y}$ (including the pyrochlore compound $Pb_2Ru_2O_{6.5}$ having a lattice parameter of 10.271 Å) and their preparation at 700° C. and 3000 atmospheres of pressure. U.S. Pat. No. 3,682,840 (Van Loan) describes the preparation of lead ruthenate at temperatures of 800° C. and higher. These references do not teach that lead, lead-rich, bismuth or bismuth-rich pyrochlore compounds may be prepared in an alkaline medium using at least one solid reactant source, at temperatures below about 200° C., as claimed herein.

U.S. Pat. Nos. 3,769,382 (Kuo et al.) and 3,951,672 (Langley et al.) both disclose the preparation of lead ruthenate and lead iridate using various techniques at temperatures of at least about 600° C., and preferably at higher temperatures. However, these references fail to recognize that the pyrochlores may be obtained at generally lower temperatures by the method of preparation of pyrochlore compounds of the present invention.

Bouchard and Gillson, Mat. Res. Bull., Vol. 6, pp. 669–680 (1971) describe $Bi_2Ru_2O_7$ and $Bi_2Ir_2O_7$ preparation and properties, including the fact that these compounds have high conductivity and small Seebeck coefficients. However, there is no teaching that these compounds are useful electrocatalysts in electrochemical devices. Derwent's Basic Abstract Journal, Section E, Chemdoc, Week No. Y25, Abstract No. 320 (Aug. 17, 1977), Derwent Accession No. 44866Y/25 describes electrodes for electrolysis of alkaline and carbonate solutions which comprise nickel-plated steel strips coated with high conductivity layers containing $Cd_2Re_2O_7$, $Pb_2Re_2O_{7-y}$ or $Ni_2Re_2O_7$. These compounds are prepared by impregnating perrhenic acid and a metal nitrate such as Cd nitrate onto a nickel strip and baking at 350° C. However, these compounds are all rhenates rather than ruthenates or iridates and are not taught to be prepared by the method of the present invention. National Bureau of Standards, Washington, D.C., Institute for Mat. Research, Abstract of Rept. No. NBSIR-75-742 (1974) describes the use of mixed oxides as oxygen-reducing electrocatalysts, none are of the pyrochlore type structure compounds made by the method of the present invention.

It is seen that the above prior art dealing with the synthesis of the electrically conductive pyrochlore structure oxides have taught synthesis at various temperatures, some at least as high as 600° C. These highly elevated temperatures have been employed because they have been considered necessary to overcome the diffusional limitations encountered in solid state reactions. These highly elevated temperatures, however, result in the formation of sintered products with low surface areas. This is a disadvantageous condition for materials used in catalytic and electrocatalytic applications since the concentration of available catalytically active sites is limited.

It would be desirable from both an energy conservation standpoint and a maximization of surface area standpoint to carry out these materials syntheses at significantly lower temperatures, e.g., below 300° C., but the kinetics of solid state reactions are unfavorably sluggish. Solution syntheses offer one possible approach to achieving these very low temperature reactions. For example, Trehoux, Abraham and Thomas, *Journal of Solid State Chemistry*, Vol. 21, pp. 203–209 (1977) and *C. R. Acad. Sc. Paris*, t. 281 pp. 379–380 (1975) describe the solution preparation of a pyrochlore compound of the formula

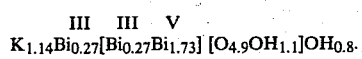

$$\text{III} \quad \text{III} \quad \text{V}$$
$$K_{1.14}Bi_{0.27}[Bi_{0.27}Bi_{1.73}][O_{4.9}OH_{1.1}]OH_{0.8}.$$

The synthesis is carried out by adding a bismuth nitrate solution to a solution of 17% potassium hydroxide containing an excess of potassium hypochlorite. The reaction is carried out in this medium for 2 hours in a reflux type of apparatus at a temperature slightly higher than 100° C. The method of synthesis and the product prepared are different in many respects from the synthesis method and products herein. The compound prepared in the cited reference is not an oxide, but rather an oxyhydroxide which has a significant amount of protons incorporated into the bulk structure. Proton nuclear magnetic resonance experiments on the materials of the present invention show that they are oxides which do not have significant amounts of protons incorporated into the structure. The pyrochlore synthesized by Trehoux et al. is not a ruthenium or iridium containing compound and, in fact, is believed not to be an electrically conductive pyrochlore. The potassium hydroxide solution used in the Trehoux reference serves not only as a reaction medium, but also as a constituent in the reaction since potassium is incorporated into the A site of the pyrochlore. In the method of the present invention the alkali solution employed is solely a reaction medium with no measurable amount of alkali metal cations incorporated in the pyrochlore compound which results from the synthesis.

Morgenstern-Badarau and Michel, *Ann. Chim.*, Vol. 6, pp. 109 et seq. (especially at 109–113)(1971), and *C. R. Acad. Sc. Paris*, Vol. 271, Seire C pp. 1313–1316 (1970) report the solution preparation of pyrochlore compounds having the formula $Pb_2Sn_2O_6 \cdot xH_2O$ where $0 < x < 1$. The conditions of preparation are strictly defined as follows: equimolar quantities of lead and tin are reacted from solution in the presence of the complexing agent nitrilo-triacetic acid (NITA) such that the concentration of $[NITA]/[Pb^{2+}]=2$. The pH of the reaction medium is fixed at 11 and the reaction is carried out for several hours at 80° C. The compound prepared by Morgenstern-Badarau et al. is a hydrated oxide whereas materials made by the method of the present invention are oxides. The pyrochlore prepared in this reference, while it does contain lead, is not a ruthenium or iridium containing pyrochlore and is believed not to be electrically conductive. Further, while the presence of a complexing agent is required in the synthesis described in the cited reference, no such complexing agent is required in the method of preparation of the present invention. Furthermore, the specified range of pH of the synthesis medium in the method of the present invention clearly differs from the range of pH within which the method of the cited reference will operate. In fact, the Morgenstern-Badarau and Michel, *Ann. Chim.*, Vol. 6, pp. 109–124 (1971) reference clearly states that no solid product compound can be obtained if conditions which are coincident with those specified for the present invention (pH > 13.5, temperature = 80° C., zero concentration of complexing agent) are employed.

In summary, there exists a formidable body of prior art describing the existence of various pyrochlores, their potential uses including uses as dielectric materials, and describing various metals and metal oxides as electrocatalyst materials. Notwithstanding such prior art, there is no suggestion or teaching that the method of the present invention may be used to make lead, lead-rich, bismuth and bismuth-rich ruthenium and iridium pyrochlore compounds.

DESCRIPTION OF THE PRESENT INVENTION

The present invention is directed to a method of preparing compounds having the formula:

$$A_2[B_{2-x}A_x]O_{7-y} \tag{1}$$

wherein A is selected from the group consisting of lead, bismuth and mixtures thereof, B is selected from the group consisting of ruthenium, iridium and mixtures thereof, and wherein x is a value such that $0 \leq x \leq 1.0$ and y is a value such that $0 \leq y \leq 1$.

The compounds made by the method of the present invention, as represented by formula (1) above, display the pyrochlore crystal structure. Pyrochlore structure oxides are represented by the general formula $A_2B_2O_6O'$ wherein A and B are metal cations. A detailed description of their crystallographic structure may be found in *Structural Inorganic Chemistry*, Fourth Edition by A. F. Wells, Clarendon Press, Oxford, 1975. Briefly, oxides of this type display a face-centered cubic structure having a unit cell dimension of about 10 Å. The B cations are octahedrally coordinated by oxygen anions (O). The structural framework is formed by a three dimensional array of these corner shared octahedra, each sharing corners with six others. This framework has the composition $B_2O_6$. As Wells describes, this framework of octahedra is "based on the diamond net, having large holes which contain the O' and two A atoms, which themselves form a cuprite-like net $A_2O'$ interpenetrating the octahedral framework." The octahedra are actually arranged in tetrahedral clusters. These clusters of octahedra are then tetrahedrally arranged so as to form the large holes in the structure described by Wells. Each of these large holes may also be defined by four tetrahedrally arranged puckered, hexagonal rings which are formed by the corner shares octahedra. The A cations reside in the center of these puckered hexagonal rings and are coordinated by the six O anions which define the rings plus two more O' cations at a slightly different distance. These O' anions reside at the center of the large holes in the octahedral framework. It is the O' anions which may be partially or totally absent, leading to the general pyrochlore oxide formula $A_2B_2O_{7-y}$ where $0 \leq y \leq 1$. Thus, the compounds made by the method of the present invention are referred to as pyrochlore compounds, and include both the stoichiometric pyrochlores and the lead-rich and/or bismuth-rich compounds of the formulas as above.

It has been discovered that the lead-rich and/or bismuth-rich pyrochlore compounds made by the method of the present invention exhibit an expanded lattice, believed to be a result of the increased amount of lead or bismuth in the crystal structure. Although merely a hypothesis at the present time, it is believed that there may exist a direct correlation between the extent of expansion of the lattice and the amount of excess lead or bismuth in the crystalline structure. Thus, it is believed that all things otherwise being equal, the greater the lattice parameter, the greater the amount of lead or bismuth and, therefore, the larger the variable x in the formula representing the compounds of the present invention.

In general terms, the method of the present invention involves the formation of a pyrochlore oxide by reacting A and B cations, using at least one solid reactant source of cations, in a liquid alkaline medium in the presence of an oxygen source at a temperature below about 200° C. for a sufficient time for reaction to occur. The synthesis occurs entirely in a solution medium, established with at least one solid source reactant and a liquid alkaline medium, where the reaction kinetics are quite favorable and not so restrictive as is found in completely solid state reactions, notwithstanding the low reaction temperature employed in the present method. These conditions result in the formation of product in good to high surface area form (e.g., 10 to 100 m$^2$/g). This surface area is particularly advantageous for materials used in a catalytic or electrocatalytic application since the concentration of available catalytically active sites is maximized.

The synthesis of mixed metal oxide materials at low temperatures (e.g., below 200° C. as is described in the present invention) requires fast reaction kinetics. The fulfillment of this requirement is usually favored if the reactant cations are provided in liquid solution form (e.g, aqueous solution sources of A and B cations). It has been discovered, however, that synthesis of pyrochlore oxides, of the type described herein, can be effectively accomplished in a liquid alkaline reaction medium at low temperature even if one or both of the reactant cations are introduced into the reaction medium in solid form. Furthermore, it is found that there are certain instances where the use of solid reactants rather than aqueous solution sources of reactant cations represents a distinct advantage. For example, in the case of lead-rich lead ruthenate a significant fraction of the lead cations incorporated in the structure are incorporated as Pb$^{4+}$ cations. Almost all aqueous solution sources of lead cations contain lead as Pb$^{2+}$ and it appears that in syntheses where aqueous solution sources of reactant cations are used the rate limiting step in the synthesis reaction is the formation of Pb$^{4+}$ ions by oxidation of Pb$^{2+}$ ions. This rate limiting step can be circumvented if the lead reactant source is a solid lead source which contains lead as Pb$^{4+}$ (e.g., lead dioxide or lead tetraacetate). It becomes evident that one may supply lead reactant cations to the synthesis medium in any desired ratio of Pb$^{2+}$ to Pb$^{4+}$ by employing appropriate mixtures of two or more different lead reactant sources.

As mentioned, the preparation method of the present invention involves the use of at least one solid reactant source and a specified liquid alkali medium. The solid reactant source may be a solid A cation reactant source, or a solid B cation reactant source, or solid sources of both A cation reactant and B cation reactant source may be used. When only an A cation or B cation solid source is used, the remaining cation source may be a liquid source, e.g., an aqueous solution source. It is also possible to employ a combination of solid and liquid reactant sources to satisfy either the A cation requirement, the B cation requirement, or both the A and B cation requirements.

The solid A cation reactant source is meant by definition to include any solid which will provide ionic A cations for reaction in the specified liquid alkali medium. Among the A cation reactant sources which may be used are lead nitrate, lead monoxide, lead dioxide, lead chloride, lead acetate, lead tetraacetate, lead carbonate, lead citrate, lead oxalate, bismuth nitrate, bismuth trioxide, bismuth pentoxide, bismuth chloride, bismuth oxalate and bismuth oxychloride as well as mixtures thereof. Of these, lead dioxide, lead tetraacetate, lead nitrate, bismuth nitrate and bismuth pentoxide are preferred. In general, the choice of solid source size is a matter of choice, depending upon the rate of reaction desired. As a practical matter, the solid reactant source should be in powdered form, with surface areas being in the range of about 0.1 to about 200 m$^2$/g, and preferably about 50 to about 200 m$^2$/g.

The solid B cation reactant source is meant by definition to include any solid which will provide ionic B cations for reaction in the specified liquid alkali medium. Among the B cation reactant sources which may be used are ruthenium oxide, ruthenium oxyhydroxide, ruthenium chloride, ruthenium nitrate, ruthenium nitrosyl nitrite, iridium chloride, iridium hydroxide, and iridium oxalic acid as well as mixtures thereof. Of these, ruthenium nitrate, ruthenium oxyhydroxide and iridium chloride are preferred. Concerning size considerations, the comments above concerning the solid A cation reactant sources is applicable.

Aqueous solution sources of reactants A and B cations are meant by definition to include any aqueous solution which will retain dissolved ionic A and/or B cations. These metal cation containing solutions may be prepared using A source materials which include lead nitrate, lead oxide, lead chloride, lead acetate, lead carbonate, lead citrate, lead oxalate, bismuth nitrate, bismuth oxide, bismuth chloride, bismuth oxylate and bismuth oxychloride as well as mixtures thereof. Desirably, the A source material used in preparing the aqueous solution containing A cations is either a lead source material or a bismuth source material, although, as mentioned, mixtures of these may be used. Among the mentioned A source materials, preferred are lead and bismuth nitrates. The B source materials used in preparing the aqueous solution source containing B cations include ruthenium chloride, ruthenium nitrate, ruthenium nitrosyl nitrite, iridium chloride, iridium hydroxide and iridium oxalic acid as well as mixtures thereof. Desirably, the B source material is either a ruthenium source or an iridium source, although mixtures thereof may be employed. The preferred B source materials include ruthenium nitrate and iridium chloride.

When an aqueous solution source is employed, it is prepared by dissolving appropriate amounts of A source material or B source material in aqueous solvent. In some cases water is adequate for this dissolution. When necessary, the A or B source materials may be dissolved in aqueous acid solutions, the acid solutions being just strong enough to cause the A or B source materials to dissolve. Acids such as a nitric or hydrochloric may be used, but nitric acid is preferred.

Whether a solid A source or solid B source, or both is employed, the A source material and the B source material are employed in relative amounts so as to achieve, in general, an initial reactant A to B ion ratio of at least about 1.0:1.0. Desirably, this ratio is within the range of about 1.0:1.0 to about 10.0:1.0. In the preferred embodiments, the A to B ion ratio for the A cation-rich pyrochlore is in the range of about 1.2:1.0 to about 5.0:1.0. As a practical matter, the reactants may be used in an A to B ion ratio appreciably higher than the ratio of A to B in the final pyrochlore product.

The liquid alkaline medium is meant by definition to include any liquid alkaline medium which will promote reaction between the A ions and B ions from the mentioned sources of A and B cations and will effect the synthesis of the desired pyrochlore structure. The liquid alkaline medium may be any which satisfies this definition and includes aqueous basic solutions of alkali metal hydroxides. Thus, the liquid alkaline medium may desirably be an aqueous basic solution containing a base selected from the group consisting of sodium hydroxide, rubidium hydroxide, cesium hydroxide, potassium hydroxide and mixtures thereof. Desirably, sufficient base is included so as to render a liquid alkaline medium having a pH of at least about 13.5. Preferably, sufficient base is employed so as to produce a liquid alkaline medium having a pH of between about 14 and 15.5. Exact amounts of base material need not be specified since pH determination is within the purview of the artisan.

It is also found to be helpful, although not necessary, to saturate the alkaline reaction medium with respect to one or more of the reactant cations (and especially with respect to the most alkali soluble cation reactant) prior to combination of the sources of A and B cations with the alkaline reaction medium. This may be done so as to avoid large discrepancies between cation ratios in the reacted product and in the initial reactant mixture due to possible solubility in the alkaline reaction medium of one or more of the reactant cations.

The akaline medium acts solely as a reaction medium and not as a constituent in the reaction. This is supported by the fact that the pyrochlores made by the method of this invention show less than 0.02% (by weight) alkali metal cation as measured by atomic absorption.

The oxygen source is meant to include by definition any source which will provide the oxygen needed to form the pyrochlore compound. The oxygen source may be any of the A source material, the B source material, the alkaline liquid medium (in the form of dissolved oxygen), or combinations thereof. Alternatively or additionally, the oxygen source may be or include independent oxygen contributing material, e.g., bubbled oxygen or oxygen-containing salts or other additives or simply an oxygen-containing atmosphere above reaction saturation. In any event, an essential aspect of the present invention compound preparation is the inclusion of adequate oxygen to permit the formation of the desired pyrochlore structure. It is important to note that an essential aspect of this invention is that the provision of oxygen be carried out only to the extent necessary for the stabilization of the particular pyrochlore desired. For example, if one wishes to synthesize lead-rich or bismuth-rich pyrochlore, it is advantageous to bubble air or oxygen through the reaction medium as well as providing the A cation in a high valent state (e.g., solid lead dioxide or solid bismuth pentoxide). On the other hand, if one wishes to prepare stoichiometric pyrochlore, a much less oxidizing environment is preferable. For example, in the case of lead ruthenate, the stoichiometric pyrochlore contains lead in the form of $Pb^{2+}$ only. Providing a significantly more oxidizing environment than that necessary for the stabilization of $Pb^{2+}$ will lead to the formation of $Pb^{4+}$ and consequently the synthesis of lead-rich pyrochlore, rather than the desired stoichiometric pyrochlore. When one wishes to synthesize stoichiometric (or non A cation-rich) pyrochlore, it is advisable to use an A cation source which contains the A cation in its lower valent state (e.g., $Pb^{2+}$ or $Bi^{3+}$), and it is also advisable to carry out the reaction in the presence of ambient atmosphere or with a blanket of oxygen or oxygen-containing gas over the reaction solution rather than bubbling air or oxygen through the reaction medium.

No criticality exists as to whether the source of A cations or the source of B cations, or both is added to the alkaline medium or whether the alkaline medium is added to one or both of the cation reactant sources. However, the former is usually practiced to insure that all of the cations see an excess of alkaline medium. In general, at least about 1.0 liter of liquid alkaline medium is used per sum of total mole of metal cation reactant. As mentioned, the reaction may be carried out at temperatures below about 200° C. Desirably, the reaction temperature is within the range of about 10° to about 100° C. Preferably, the reaction is carried out at temperatures within the range of about 50° to about 80° C.

During the reaction period the alkaline medium may be replaced with fresh alkaline medium although this is not necessary for successful practice of the invention.

The reaction is carried out for a time sufficient for reaction to occur. With many reactant combinations, at least a partial reaction occurs almost instantly. In any event, the length of time over which the reaction should be allowed to proceed is a matter of choice. Within limits, however, the longer the reaction time, the greater the extent of reaction. As a practical matter, a significant amount of reaction product is obtained by reacting for about 5 hours, and generally a reaction time of about 8 hours to about 72 hours is advantageous.

After the reaction is completed to the desired degree, the reaction product may be separated by known separation means. These separation techniques include filtration and centrifugation. Various post treatments may be employed as desired. These might include heat treatments to improve the crystallinity of the product and/or washing in various media in order to leach out any unreacted metal species. The reaction product includes one or more of the pyrochlore compounds of formula (1) above. When preferred amounts of reactants are employed, compounds of formula (1) may be obtained wherein $0 \leq x \leq 1.0$. Thus, among the compounds obtained are:

  (2)

  (3)

  (4)

  (5)

  (6)

  (7)

and the like, wherein x and y are as defined, and wherein a+b=2 and c+d=x. Also, included are the bismuth-rich counterparts to the foregoing and other variations within the scope of formula (1) which should now be apparent to the artisan. As mentioned, the above pyrochlores produced by the method of the present invention exhibit a good to high surface area. Further, these compounds display high electronic conductivity, thus making them particularly useful for electrode applications, e.g., as oxygen electrodes.

EXAMPLES

The present invention will be more fully appreciated in view of the following examples. However, these examples are presented for illustrative purposes, and the present invention should not be construed to be limited thereto:

EXAMPLE 1

A lead-rich lead ruthenate pyrochlore, e.g., $Pb_2[Ru_{2-x}Pb_x]O_{7-y}$, is prepared as follows:

A 2.0:1.0 molar ratio of lead to ruthenium is supplied to the reaction medium by simultaneously adding to 100 ml of 3 M sodium hydroxide, about 4.39 grams of solid $Pb(C_2H_3O_2)_4$ and about 1.42 grams of $Ru(NO_3)_3$ (in aqueous solution) with 50 ml of distilled water. Precipitation of a solid occurs immediately. The reaction medium is heated to 50° C. and the reaction is carried out, with stirring and with oxygen being bubbled through the reaction medium, for approximately 16 hours. The solid is then separated by vacuum filtration, washed in distilled water, and dried at 100° C. X-ray diffraction shows that the reacted product is a crystalline pyrochlore with a lattice parameter of 10.506 Å plus a minor impurity phase of $PbO_2$. The composition of the pyrochlore phase is estimated, on the basis of a composition vs. lattice parameter correlation established for lead ruthenate pyrochlores, to be $Pb_2[Ru_{1.27}Pb_{0.73}]O_{7-y}$. The surface area of the synthesized product, measured by the BET $N_2$ adsorption method, is 53 m²/g.

A control synthesis experiment which is carried out under the same conditions, but which employs an aqueous solution of lead nitrate as the lead source, does not yield a crystalline pyrochlore product. It is found that syntheses employing aqueous solution sources of reactant cations and reaction temperatures of 50° C. generally require at least several days of reaction for the synthesis of a crystalline pyrochlore.

EXAMPLE 2

To illustrate the utility of the compound which is obtained by the method of Example 1, electrocatalytic performance data are obtained in 3 N KOH at 75° C. In these tests, the material is fabricated into test electrodes consisting of that catalyst, a binder, a wetproofing agent and a support. Teflon serves as both a binder and wetproofing agent for all the electrodes tested. Gold expanded metal screen is used as the support.

Electrodes are fabricated by mixing a weighed amount of catalyst with a few drops of water, adding a measured volume of Teflon 42 suspension, and mixing vigorously to precipitate the Teflon. The gummy product is then spread on weighed gold Exmet screen and is pressed dry between filter paper. The electrode is then cold pressed for 0.5 min. at 200 psi, is allowed to air dry for 30 min. and is then hot pressed in an inert atmosphere at 325° C., 500 psi for 0.5 min. After cooling, the electrode is weighed to determine its loading and then placed in the electrochemical cell for testing.

The electrochemical half-cell used for testing is of the interface maintaining type and consists of a jacketed liquid phase cell compartment. The liquid side contains the platinum wire counter electrode, a saturated calomel reference electrode (in contact by Lugin capillary), and magnetic stirrer. The gas side contains the gas (oxygen) inlet and outlet and a stopcock to drain off any condensate. The working electrode is held in place (between the two compartments) between two Teflon discs with a gold current collector pressing against it.

The cell is connected to a Princeton Applied Research Model 173 potentiostat with a programmer and logarithmic current converter. Constant rate potential sweep measurements are conducted. Outputs of potential and log of current are recorded on an x-y plotter, and the resulting potential vs. log current density plot, referred to as a performance curve, is used to evaluate the electrode activity.

Table I shows performance data for the electrocatalytic reduction of oxygen in 3 M KOH at 75° C. using the catalyst of Example 1. The data in Table I show that the lead-rich lead ruthenate pyrochlore of Example 2 does have significant elecrochemical activity for oxygen reduction.

TABLE I

| Activity Data For The Electro-Reduction Of Oxygen In 3M KOH At 75° C. | |
|---|---|
| Current Density (mA/cm²) | Potential (mV vs. RHE) |
| 0.5 | 1044 |
| 1.0 | 1044 |
| 5.0 | 993 |
| 10 | 957 |
| 50 | 907 |
| 100 | 886 |
| 200 | 856 |

EXAMPLE 3

A lead-rich lead ruthenate pyrochlore, e.g., $Pb_2[Ru_{2-x}Pb_x]O_{7-y}$, is prepared as follows:

A 2.0:1.0 molar ratio of lead to ruthenium is supplied to the reaction medium by simultaneously adding to 200 ml of 3 M KOH about 4.39 grams of $Pb(C_2H_3O_2)_4$ slurried in 50 ml of glacial acetic acid and about 1.42 grams of $Ru(NO_3)_3$ (in aqueous solution) with 50 ml of distilled water. Precipitation of a solid occurs immediately. The reaction medium is heated to 65° C. and the reaction is carried out, with stirring and with oxygen being bubbled through the reaction medium, for approximately 16 hours. The solid is then separated by vacuum filtration, washed in distilled water, and dried at 100° C. X-ray diffraction shows that the reacted product is a crystalline pyrochlore with a lattice parameter of 10.545 Å. The lead to ruthenium molar ratio, as determined experimentally by X-ray fluorescence, is 2.38±0.05:1.0. The formula of the synthesized lead-rich lead ruthenate pyrochlore may, therefore, be expressed as $Pb_2[Ru_{1.18}Pb_{0.82}]O_{7-y}$. The surface area of the synthesized product, measured by the BET $N_2$ adsorption method, is 60 m²/g.

EXAMPLE 4

To illustrate the utility of the compound which is obtained by the method of Example 3, electrocatalytic performance data are obtained in 3 M KOH at 75° C. and displayed in Table II.

TABLE II

Activity Data For The Electro-Reduction Of Oxygen In 3M KOH At 75° C.

| Current Density (mA/cm$^2$) | Potential (mV vs. RHE) |
|---|---|
| 0.5 | 1053 |
| 1.0 | 1053 |
| 5.0 | 994 |
| 10 | 949 |
| 50 | 909 |
| 100 | 890 |
| 200 | 869 |

EXAMPLE 5

A lead-rich lead ruthenate pyrochlore, e.g., $Pb_2[Ru_{2-x}Pb_x]O_{7-y}$, is prepared as follows:

A 2.0:1.0 molar ratio of lead to ruthenium is supplied to the reaction medium by adding to 100 ml of 3 M NaOH about 2.37 grams of $PbO_2$ slurried in 100 ml of distilled water and about 1.42 grams of $Ru(NO_3)_3$ (in aqueous solution) with 50 ml of distilled water. Precipitation of a solid occurs immediately. The reaction medium is heated to 50° C. and the reaction is carried out, with stirring and with oxygen being bubbled through the reaction medium, for approximately 16 hours. The solid is then separated by vacuum filtration, washed in distilled water, and dried at 100° C. X-ray diffraction shows that the reacted product is a crystalline pyrochlore with a lattice parameter of 10.407 Å. The composition of the pyrochlore is estimated, on the basis of a composition vs. lattice parameter correlation established for lead ruthenate pyrochlores, to be $Pb_2[Ru_{1.55}Pb_{0.45}]O_{7-y}$.

EXAMPLE 6

A lead-rich lead ruthenate pyrochlore, e.g., $Pb_2[Ru_{2-x}Pb_x]O_{7-y}$ is prepared as follows:

Ruthenium oxyhydroxide is prepared by adding 5.23 grams of $Ru(NO_3)_3$ (in aqueous solution) to 400 ml of 12 M KOH. Precipitation of a solid occurs immediately. The reaction medium is heated to 75° C. and the reaction is carried out, with stirring, for about 6 days. The solid is then separated by vacuum filtration, washed in distilled water, and dried at 100° C. About 1.60 grams of this ruthenium oxyhydroxide solid is then added to 300 ml of 12 M KOH which is 0.09 M in lead. The reaction medium is heated to 75° C. and the reaction is carried out, with stirring and with oxygen being bubbled through the reaction medium for approximately 5 days. The solid is then separated by vacuum filtration, washed in distilled water, and dried at 100° C. X-ray diffraction shows that the reacted produce consists of crystalline, lead-rich lead ruthenate pyrochlore plus $Pb_3O_4$.

What is claimed is:

1. A method of preparing compounds having the formula:

ti $A_2[B_{2-x}A_x]O_{7-y}$ wherein A is selected from the group consisting of lead, bismuth and mixtures thereof, wherein B is selected from the group consisting of ruthenium, iridium and mixtures thereof, wherein x is a value such that $0 \leq x \leq 1.0$ and y is a value such that $0 \leq y \leq 1$, comprising:

reacting A cations and B cations from at least one solid cation reactant source in a liquid alkaline medium having a pH of at least about 13.5 in the presence of an oxygen source at a temperature below about 200° C. for a sufficient time for reaction to occur.

2. The method of claim 1 wherein said solid cation reactant source is an A cation reactant source selected from the group consisting of lead nitrate, lead monoxide, lead dioxide, lead chloride, lead acetate, lead tetraacetate, lead carbonate, lead citrate, lead oxalate, bismuth nitrate, bismuth trioxide, bismuth pentoxide, bismuth chloride, bismuth oxalate, and bismuth oxychloride and mixtures thereof.

3. The method of claim 2 wherein said liquid alkaline medium is an aqueous basic solution of alkali metal hydroxide.

4. The method of claim 3 wherein said aqueous basic solution contains a base selected from the group consisting of sodium hydroxide, rubidium hydroxide, cesium hydroxide, potassium hydroxide and mixtures thereof.

5. The method of claim 4 wherein said reacting is performed within the temperature range of about 10° C. to about 100° C.

6. The method of claim 5 wherein said pH is within the range of about 14 to about 15.5.

7. The method of claim 6 wherein said reacting is performed within the temperature range of about 50° C. to about 80° C.

8. The method of claim 1 wherein said solid cation reactant source is a B cation reactant source selected from the group consisting of ruthenium oxide, ruthenium oxyhydroxide, ruthenium chloride, ruthenium nitrate, ruthenium nitrosyl nitrite, iridium chloride, iridium hydroxide, and iridium oxalic acid as well as mixtures thereof.

9. The method of claim 8 wherein said liquid alkaline medium is an aqueous basic solution of alkali metal hydroxide.

10. The method of claim 9 wherein said aqueous basic solution contains a base selected from the group consisting of sodium hydroxide, rubidium hydroxide, cesium hydroxide, potassium hydroxide and mixtures thereof.

11. The method of claim 10 wherein said reacting is performed within the temperature range of about 10° C. to about 100° C.

12. The method of claim 11 wherein said pH is within the range of about 14 to about 15.5.

13. The method of claim 12 wherein said reacting is performed within the temperature range of about 50° C. to about 80° C.

14. The method of claim 1 wherein both A cation reactant and B cation reactant are from solid cation reactant sources.

15. The method of claim 1 wherein A is lead.

16. The method of claim 15 wherein said solid cation reactant source is an A cation reactant source selected from the group consisting of lead nitrate, lead monoxide, lead dioxide, lead chloride, lead acetate, lead tetraacetate, lead carbonate, lead citrate, lead oxalate and mixtures thereof.

17. The method of claim 16 wherein said liquid alkaline medium is an aqueous basic solution of alkali metal hydroxide.

18. The method of claim 17 wherein said aqueous basic solution contains a base selected from the group consisting of sodium hydroxide, rubidium hydroxide, cesium hydroxide, potassium hydroxide and mixtures thereof.

19. The method of claim 18 wherein said reacting is performed within the temperature range of about 10° C. to about 100° C.

20. The method of claim 19 wherein said pH is within the range of about 14 to about 15.5.

21. The method of claim 20 wherein said reacting is performed within the temperature range of about 50° C. to about 80° C.

22. The method of claim 15 wherein said solid cation reactant source is a B cation reactant source selected from the group consisting of ruthenium oxide, ruthenium oxyhydroxide, ruthenium chloride, ruthenium nitrate, ruthenium nitrosyl nitrite, iridium chloride, iridium hydroxide, and iridium oxalic acid as well as mixtures thereof.

23. The method of claim 16 wherein said liquid alkaline medium is an aqueous basic solution of alkali metal hydroxide.

24. The method of claim 17 wherein said aqueous basic solution contains a base selected from the group consisting of sodium hydroxide, rubidium hydroxide, cesium hydroxide, potassium hydroxide and mixtures thereof.

25. The method of claim 18 wherein said reacting is performed with the temperature range of about 10° C. to about 100° C.

26. The method of claim 19 wherein said pH is within the range of about 14 to about 15.5.

27. The method of claim 20 wherein said reacting is performed within the temperature range of about 50° C. to about 80° C.

28. The method of claim 15 wherein both A cation reactant and B cation reactant are from solid cation reactant sources.

29. The method of claim 1 wherein A is bismuth.

30. The method of claim 29 wherein said solid cation reactant source is an A cation reactant source selected from the group consisting of bismuth nitrate, bismuth trioxide, bismuth pentoxide, bismuth chloride, bismuth oxalate, bismuth oxychloride, and mixtures thereof.

31. The method of claim 30 wherein said liquid alkaline medium is an aqueous basic solution of alkali metal hydroxide.

32. The method of claim 31 wherein said aqueous basic solution contains a base selected from the group consisting of sodium hydroxide, rubidium hydroxide, cesium hydroxide, potassium hydroxide and mixtures thereof.

33. The method of claim 32 wherein said reacting is performed within the temperature range of about 10° C. to about 100° C.

34. The method of claim 33 wherein said pH is within the range of about 14 to 15.5.

35. The method of claim 34 wherein said reacting is performed within the temperature range of about 50° C. to about 80° C.

36. The method of claim 29 wherein said solid cation reactant source is a B cation reactant source selected from the group consisting of ruthenium oxide, ruthenium oxyhydroxide, ruthenium chloride, ruthenium nitrate, ruthenium nitrosyl nitrite, iridium chloride, iridium hydroxide, and iridium oxalic acid as well as mixtures thereof.

37. The method of claim 30 wherein said liquid alkaline medium is an aqueous basic solution of alkali metal hydroxide.

38. The method of claim 31 wherein said aqueous basic solution contains a base selected from the group consisting of sodium hydroxide, rubidium hydroxide, cesium hydroxide, potassium hydroxide and mixtures thereof.

39. The method of claim 32 wherein said reacting is performed within the temperature range of about 10° C. to about 100° C.

40. The method of claim 33 wherein said pH is within the range of about 14 to about 15.5.

41. The method of claim 34 wherein said reacting is performed within the temperature range of about 50° C. to about 80° C.

42. The method of claim 29 wherein both A cation reactant and B cation reactant are from solid cation reactant sources.

* * * * *